INVENTORS
Longine Koprow
Walter R. Saks
BY
ATTORNEY

INVENTORS
Longine Koprow
Walter R. Saks
ATTORNEY

United States Patent Office 2,784,630
Patented Mar. 12, 1957

2,784,630

METHOD OF MAKING FLOCKED FABRIC AND FLOCKED VINYL FILM

Longine Koprow, Dumont, N. J., and Walter R. Saks, Malverne, N. Y., assignors to United Merchants and Manufacturers, Inc., New York, N. Y., a corporation of Delaware Application January 28, 1955, Serial No. 484,654

2 Claims. (Cl. 18—57)

This invention relates to the production of unsupported films, and particularly those made of or containing a substantial proportion of vinyl chloride resin.

One object of the invention is a method for making washable vinyl chloride resin films characterized by the feature of having a surface deposit of flock. A further object is the incorporation in film forming dispersions or materials of the character referred to, of a suitable agent for securing improved adhesion of the flock particles to the base film whereby even after repeated washings the flock will remain firmly secured to the base vinyl chloride film. Another object is a method of making washfast flocked films in which the flocked fibers are deposited on, or in a film forming dispersion of vinyl chloride before the dispersion has actually hardened into a film.

A still further object is the production of vinyl chloride resin films having an all-over deposit or local pattern application of flock in which the individual flock particles are substantially permanently secured or fixed to the vinyl chloride film or sheet. Ia is also proposed to impart the characteristic of water repellency, or water phobia, at least to those portions of the vinyl chloride film, the surfaces of which are covered by the flock particles.

More particularly, the present invention concerns itself with the production of flocked articles especially in the form of webs, films, or sheets made from vinyl chloride polymer or co-polymer film-forming dispersions of the type known as organosols and plastisols. In organosol vinyl chloride dispersions, the liquid phase thereof is nonaqueous and contains volatile liquids. In the case of the plastisol, this is a vinyl chloride dispersion in which the liquid phase consists solely of one or more plasticizers. Where greater fluidity of the resin-plasticizer mixture is required, the volatile organic liquids can be added, and dispersions of this type are called organosols. Such plastisols and organosols can be used for coatings of paper, fabric, foil, floor coverings, and for other purposes.

In addition to the composite flock-vinyl chloride film sheeting, as referred to above and hereinafter more fully described, the invention further proposes a method of making the same involving that which for convenience may be termed herein a "one pass operation." That is to say, this invention contemplates the production of films of polymers and co-polymers of vinyl chloride comprising a flock application to the surface thereof in which the vinyl chloride film is formed as a sheet, and substantially simultaneously receives a deposit of flock on its surface without any intermediate step of solidifying, fusing, or curing of the film before depositing the flock.

The patent to Smith, U. S. No. 2,472,551, is an example of a method for forming plastic sheeting and applying flock thereto after the sheet has been solidified and divested of its previous freely flowing amorphous or batch state. According to the present invention, as distinguished from the Smith disclosure, the plastic sheet is formed, but while the film is still in the unsolidified state, flock is deposited thereon.

A still further object is the making of film forming media adapted to receive and retain flock fibers. More particularly, the invention proposes a method of obtaining flocked vinyl chloride film characterized by the fact that the film remains soft and flexible, and further characterized by good wet and dry adhesion of the flock to the film.

A still further object is the modification of plastisol or organosol dispersions of the character described, by the addition of an isocyanate, for example, a mono-isocyanate, di-isocyanate, tri-isocyanate, or other isocyanate. In this regard, it has been found that by incorporating the isocyanate, or a mixture of isocyanates, in the plastic film forming dispersion, the fixation of the flock particles is improved. While it is known, as disclosed in U. S. Patent No. 2,439,514, to use isocyanates for the bonding of rubber to cellulose derivatives in the manufacture of automobile tires or the like, this is quite different from the concepts of the present invention which have to do with the incorporation of an isocyanate agent in a vinyl chloride polymer or co-polymer organosol or plastisol in a method of making, as the new article of manufacture, vinyl chloride flocked films in which the connection between the film and the flock is washfast or will withstand repeated washings and will resist stresses, as, for example, abrasions or abrasive forces.

Broadly speaking, there is contemplated herein the application of flock to modified vinyl chloride resin filmforming media, the modification comprising the addition of an isocyanate to the film-forming material. The term "flocking" comprehends the deposition or distribution and fixation of finely divided particles or fragmentary material upon a surface, usually but not always in pattern form or design arrangement. The particles so deposited are referred to as "flock" and ordinarily comprise very short cotton, rayon or wool fibers or other fibrous or filamentary material less than one-quarter of an inch in length; often one thirty-second or one-sixteenth of an inch. The diameter of the flock varies also, and usually is based upon the functional requirements of its end uses. In the textile industry flock is commonly applied for decorative effects to draperies, upholstery, print goods and dress goods. The flock may be attached or affixed to the surface by first applying to the material to be flocked a suitable adhesive for the flock as by means of a knife coater, stencil, cylinder roller, spray gun or silk screen, and subsequently depositing the flock fibers on the wet adhesive with a so-called beater bar, which utilizes the beating effect of a flat sided bar rotating against the underside of the sheet to be flocked. Alternatively, the flock may be applied by other means, for example, electrostatically, after the application of the adhesive to the surface of the material or web, by placing the adhesive carrying web in an electric field and supplying flock fibers to the region of the electric field whereby the fibers are oriented and deposited on the adhesive covered portions of the web surface.

It has been found that mono-isocyanates, such as phenyl isocyanate, octadecyl isocyanate, and alpha naphthyl isocyanate, can be incorporated satisfactorily in organosols or plastisols. Di-isocyanates, such as 2,4-toluene di-isocyanate, diphenylmethane di-isocyanate (methylene bis 4-phenyl isocyanate), 3,3¹-dimethyl-4,4¹-biphylene di-isocyanate (bitolylene di-isocyanate), and/or 3,3¹-dimethoxy-4,4¹-biphenylene di-isocyanate may be included in the dispersion. The only tri-isocyanate believed to be commercially available at the present time is triphenylmethane tri-isocyanate; and this is another specific isocyanate which may be incorporated in the plastic film dispersion.

With regard to the character or type of suitable flock, the flock particles may comprise fibers of cotton, acetate, viscose, nylon, polyacrylonitrile, wool, or other natural or synthetic fibers, or blends, or mixtures thereof. The flock may also comprise blends of deniers and lengths, as well as types of fibers, with the deniers usually ranging from between about 1½ denier to about 20 denier, and the length of fibers usually varying between from about .010 inch to about .5 inch.

Heretofore, the process of flocking into a cast vinyl organosol or plastisol has been attempted. However, the resulting product, especially in the case of viscose flock, produced either a soft film with poor flock adhesion or a stiff brittle film with fair to good flock adhesion. The marketability of these films was therefore badly impaired.

Attempts have also been made to flock a prefabricated vinyl film by applying an adhesive to the surface of a .002"–.010" film. The problems of flocking light gauge film are such that either a stiff boardy product resulted, or a product exhibiting poor adhesion of flock and film. In most cases the solvent action of the adhesive which is nearly always necessary in order to bond to the vinyl film, released the stresses and strains in the film and caused distortions.

According to the present invention, it has been found that the bond of the flock, especially flock made of viscose rayon, to cast organosol or plastisol media, is greatly improved by the addition to the dispersions of urea formaldehyde and melamic formaldehyde type resins, and other types of resins, as, for example, acrylics. This addition of improved adhesion is outweighed, however, by the concomitant fact that the flock films were found to be brittle, and of poor tensils strength.

In developing the flocked films here proposed, it was found that where the isocyanate modifier was not incorporated in the plastisol or organosol the flock had a tendency to come out under slight abrasion. Moreover, upon washing the product with soap and water, or merely wetting it, the particles of viscose flock swell considerably. Because they swell these flock particles have a tendency to burst forth from their respective anchorages in the base film, and thereby separate themselves therefrom. Moreover, after the washed flock is dried, especially if the flock is made from regenerated cellulose or viscose, the flock tends to shrink upon drying, thus tending to weaken further the bond between fiber and film, and compounding the tendency initiated by the swelling to separate from the base film.

By including small percentages of isocyanates, for example, di-isocyanate, and specifically methylene bis 4-phenyl isocyanate, in an organosol or plastisol made from a vinyl chloride dispersion, the adhesion of the film to the flock, or vice versa, was improved, whether the flock was made from regenerated cellulose, cotton, or nylon, or mixtures thereof, or other material in discrete form. The adhesion of flock made from viscose was particularly improved.

Furthermore, it was found that by adding plasticizers of the polyester type, as, for example, Paraplex G–50 made by Rohm and Haas Co. of Philadelphia, Pa., or blends thereof, the quality of the composite flock-film was further improved.

It was also found that the mono-isocyanates, as for example, phenyl isocyanate, may be used in place of the di-isocyanates with similar results, although with this limitation or condition, that a higher percentage or concentration of the mono-isocyanate must be used to achieve a degree of fixation comparable to that obtained with the di-isocyanate.

Moreover, by using larger amounts or greater percentages of the mono-isocyanates or di-isocyanates than that required merely to improve the fixation of the flock to the film, there are obtained varying degrees of water repellency of the flock: the degree of water repellency varying directly with the concentration of mono-isocyanate or di-isocyanate included.

In the cases mentioned, that is where the mono- or di-isocyanate was used, whether in amounts sufficiently merely to improve the bond, or additively sufficient to impart water repellency, the flocked film possessed the soft, supple and extensible washable properties desired.

With the above and other objects in view, as will be apparent, the present invention consists in the construction, combination and arrangement of parts, all as hereinafter more fully described, claimed and illustrated in the accompanying drawings, wherein:

Fig. 1 schematically illustrates apparatus suitable for making flocked vinyl chloride films according to at least one embodiment of the present invention, and indicates one sequence of production steps from the time a temporary carrier is laid down in position to receive a surface coating of a vinyl chloride film forming dispersion, after which, successively, the film may be passed through a drying chamber, a flocking chamber, a plurality of ovens, and a steambox, and finally to a processing zone where the flocked film is stripped away from its temporary carrier for ultimate disposition;

Figure 6B:
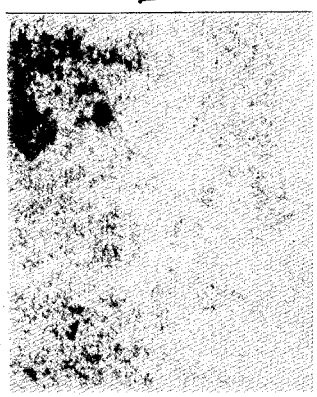
Figure 6A:
Figure 7A:
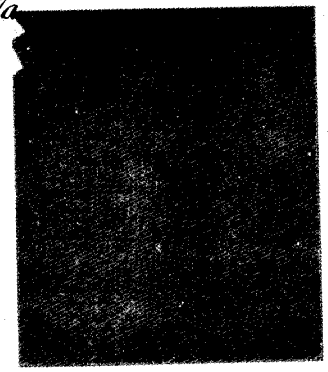
Figure 7B:
Figure 8A:
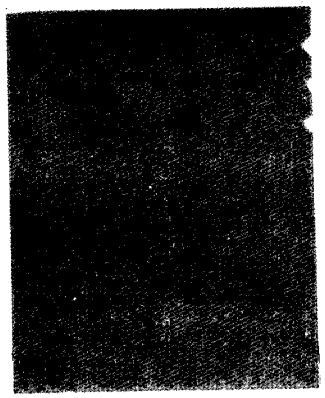
Figure 8B:
Figure 9A:
Figure 9B:

Fig. 6a is a photo taken before washing, of a cut of a control sample containing no iso-cyanate; and Fig. 6b is a picture of another swatch taken from the same sample after one AATCC Test No. 2 wash, Standard Test Method 36–52, said Standard Test Method being described at length on pages 91 and 92 of the 1953 Technical Manual and Year Book of the American Association of Textile Chemists and Colorists, volume XXIX, published 1953 by Howes Publishing Co., Inc. of New York city;

Fig. 7a is a picture of a piece of the flocked film of Fig. 6 except that it comprises a mono-isocyanate, namely, phenyl isocyanate, before washing; and Fig. 7b is a photo of another cut from the same film as that shown in Fig. 7a after one AATCC Test No. 2 wash—Standard Test Method 36–52;

Fig. 8a is a picture of flocked vinyl film containing a di-isocyanate, namely, methylene bis 4-phenyl isocyanate, before washing; and Fig. 8b is a photo of another swatch of the same material after one AATCC Test No. 2 wash as per the same method, namely, Method 36–52; and Fig. 9a is a photograph of another sample of the same flocked vinyl chloride film, before washing, which contains the tri-isocyanate known as tri-phenylmethane tri-isocyanate; and Fig. 9b is a photo of another piece of the same material after one wash according to Test No. 2 of Method 36–52.

A word of explanation concerning the angular cutout portions seen in the several pictures of the drawings is as follows. A single cutout portion means the film so cut does not comprise any isocyanate composition; two-cutouts indicate the film incorporates a mono-isocyanate; three cuts are used to indicate the use of a di-isocyanate;

and four cuts means a tri-isocyanate composition in the film.

Speaking in general, it may be noted that the present invention contemplates the steps of casting, or otherwise depositing on a carrier such as paper, stainless steel, or other surface, a film or sheet of an organosol or plastisol made of or containing a dispersion of vinyl chloride resin, and comprising also a modifier in the nature of an isocyanate. The organosol or plastisol may be cast or otherwise laid down in a one pass operation (as heretofore defined), and while the vinyl dispersion is still wet, flock fibers may be applied thereto by any suitable means, as for example, by electrostatic deposition, or by mechanical vibration, by spray, or gravity fed hopper, or by other techniques whereby the multitude of flock fibers is oriented and partially embedded in the wet dispersion to a depth ranging between .0001" and .004", with the balance of the flock left protruding from the surface of the film forming medium. It will be understood, of course, that the extent of impregnation of the flock fibers into film forming medium is regulated, at least in part, by control of the viscosity and wetting property of the film forming dispersions employed. After the flock has been deposited in the modified film forming medium, the product may be fused or cured by gradually heating to a temperature of from about 300° F. to about 425° F. for a period of time ranging from about 15 seconds to about 60 seconds or more.

Figure 1:
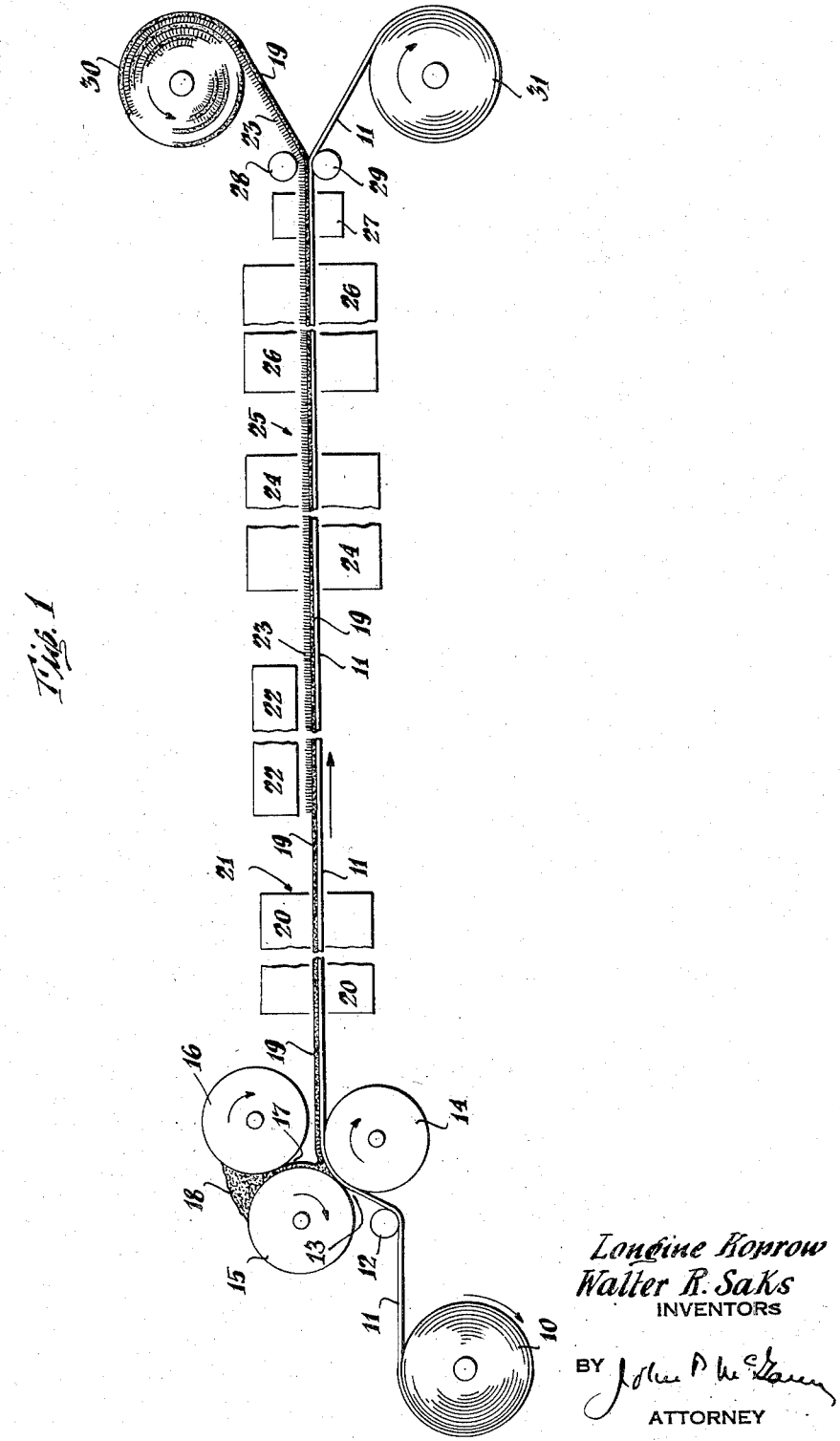
Figure 2:
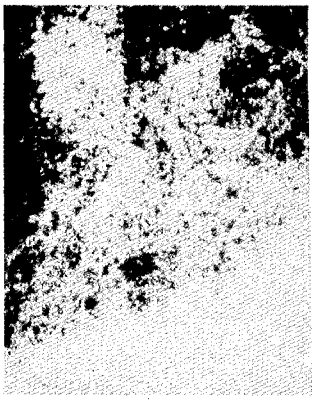
Fig. 2 is a photograph of a swatch of a vinyl chloride film flocked with viscose fibers, in which no isocyanate was incorporated, after two hand washings with soap and water at 120° F. The white portions of the film surface shown are the portions from which the flock was lost by reason of unsatisfactory adhesion during the washing processes.
Figure 3:
Fig. 3 is a picture of a piece of flocked vinyl chloride film differing from the film of Fig. 2 only in that a mono-isocyanate, namely, phenyl isocyanate, was incorporated in the film forming dispersion of vinyl chloride. In this instance also the flocked fabric was subjected to two hand washings with soap and water at 120° F.
Figure 4:
Fig. 4 is a photo of a cut of the same type of flocked film as that shown in Figs. 2 and 3, with the exception that in this case a di-isocyanate, namely, methylene bis 4-phenyl isocyanate was utilized, the flocked fabric having sustained two hand washings with soap and water at 120° F.
Figure 5:
Fig. 5 is a picture, similar to those of Figs. 2, 3 and 4, but differing therefrom in that in this instance a tri-isocyanate, namely, tri-phenylmethane tri-isocyanate was employed, and here also the flocked fabric was subjected to two hand washings with soap and water at 120° F.

A sketch of apparatus suitable and convenient for manufacturing composite flock-vinyl chloride film products according to the present invention is indicated in Fig. 1. As there shown, the same may comprise a take-off roll 10 adapted to pay out or unwind a temporary carrier 11 which may be made of paper, canvas, glass, steel or rubber, or other suitable carrier material in the form of a sheet or web. The carrier 11 may be unwound from the carrier roll 10 by any convenient motive power (not shown) and carried from thence under a lease rod 12 and through the operating nip 13 of a pair of coacting film forming rollers comprising a rubber covered pressure roll 14 constructed and arranged to rotate clockwise as shown by the arrow therein, and a complementary steel coating roll 15, which is also constructed and arranged to rotate clockwise and in unison with the pressure roller 14.

As further shown in Fig. 1, there may be provided, in addition to the coacting rolls 14—15, an auxiliary coating roller 16 superposed adjacent the steel roll 15, and like the rubber pressure roll 14 and the prime coating roll 15, constructed and arranged to rotate clockwise and in unison therewith, all as shown by the several arrows within the outlines of the rolls 14, 15 and 16.

The nip 17 formed by the respective working surfaces of the rollers 15 and 16 constitutes a convenient means for holding a supply 18 of the modified vinyl chloride dispersion composition, of suitable viscosity, which is to make up the vinyl chloride film.

As the series of coacting rollers 14, 15 and 16 rotate in unison and in the same direction, the dispersion 18 comprising a film forming vinyl chloride organosol or plastisol, modified by the addition of an isocyanate, finds its way past the nip 17 of the primary and auxiliary coating rollers 15, 16, and, clinging to the outer surface of the roller 15, moves therewith until it reaches the temporary carrier 11 which simultaneously is passing through the nip 13 of the rollers 14 and 15. That is to say, as the temporary carrier 11 passes beyond the nip 13 of the rollers 14, 15, there is spread over its top surface a layer, coating or deposit of the film forming vinyl chloride dispersion 18 which finds passage through the nip 17 of the coating rolls 15, 16 and from thence on to the exposed upper surface of the moving carrier 11.

It may be noted here that while the assembly of the several rollers 14, 15 and 16 is commonly known as a reverse roll coater, other means for spreading or forming a layer of film on top of the carrier 11 may be employed with similar effect, as for example, a knife coater apparatus may be utilized, or a vinyl chloride film may be laid down as by a spray mechanism, or an electrostatic spray adapted to be actuated under air pressure, or a revolving shower head or other means for laying down the coating may be used.

While still in the flowable state, the coating of film forming material 19 deposited on the temporary carrier 11 from the composition trough 18 may travel with the carrier 11 through a drying chamber 20 wherein the diluent components of the vinyl dispersion are partially evaporated or volatilized and the vinyl resin is partially solvated to raise the viscosity of the dispersion. After emerging as at 21 from the drying chamber 20, the as yet unflocked coating of vinyl chloride dispersion 19 may have a viscosity of the order of from about 20,000 to about 100,000 centerpoises, as contrasted with a much lower viscosity of about 1,000 to about 5,000 centerpoises while contained as a source of dispersion supply at the nip 18 of the prime and auxiliary coating rollers 15—16.

The more viscous vinyl chloride dispersion, modified by the addition of an isocyanate, is now ready to be flocked, and for that purpose, while still on the carrier 11, is introduced to a flocking chamber 22, where flock of the character and form described above is applied by electrostatic means, although, as also pointed out above, the flock alternatively may be deposited and oriented and embedded in the exposed surface of the vinyl chloride coating 19 as by mechanical beater vibrations, or by other conventionally known means.

After the flock 23 has been deposited, oriented and embedded on the top surface of the fairly viscous vinyl dispersion 19, the composite product is ready to be passed into the curing chambers 24 and 26 where the vinyl chloride flocked dispersion is fused into a flocked film. In practice, it has been found satisfactory to split up the step of curing into two stages, and in the first stage to pass the flocked dispersion 19 through a preliminary curing oven operated at a relatively low temperature— say from about 200° F. to about 250° F. The speed of travel of the flocked dispersion 19 through the initial drying chamber 24 should be such as to subject the dispersion therein to the curing action of the low temperature oven 24 for a period of time ranging from about 1 minute to about 2 minutes to gel and remove residual volatiles, if any. Manifestly, the rate of travel of the film 19 through the oven 24 may be speeded up if the temperature of the oven 24 is increased substantially above 250° F., and conversely, the rate of passage through oven 24 should be slowed down if the temperature is decreased substantially below 200° F.

After emergence from the preliminary low temperature oven 24, the partially cured flocked film 19 may pass through an open zone 25 before passing into the second or final curing or high temperature oven 26. If desired, the film 19 may pass immediately and directly from the first oven 24 into the second oven 26 without passing through the intermediate open zone 25.

The temperature of the second or final high temperature curing oven may be of the order of from about 300° F. to about 425° F., and the rate of travel of the flocked film 19 therethrough may be the same as the rate of its travel through the first oven 24, which is to say it is such that the vinyl chloride film 19 may be within the enclosure of the second oven 26 and subjected to the action thereof for a period ranging from about 30 seconds to about 2 minutes. Here again, in the case of the final curing oven 26 the rate of travel of the film 19 therethrough can be speeded up if the temperature therein is increased, and should be slowed down if the temperature is decreased. In other words, the rate of travel is directly proportional to the amount of heat, and should be varied directly therewith, not inversely.

To impart an attractive hand and/or appearance to the flocked film 19 after it has been finally cured or fused, without interruption of movement thereof, the same may be run into and through a steambox, as at 27, after which the composite flocked film 19, still in contact with its temporary carrier 11, may be passed through a plurality of tension rods 28, 29 adapted to facilitate the stripping of the flocked film 19 from its temporary carrier 11, and upon being separated the flocked film 19 may be wound up on a delivery roller 30 rotating counter-clockwise as shown by the arrow therein. At the same time the temporary carrier 11, after separation from the film 19, may be wound up for re-use on the reel 31 rotating clockwise, as shown by the arrow. It will be understood, of course, that if desired, instead of having the temporary carrier 11 unwound from the carrier roll 10 at the beginning of the process and wound up on the storage roll 31 at the end of the manufacturing operation, the carrier 11 may be made in the form of a continuous or endless belt (not shown). It is also pointed out that if circumstances render the same desirable, means may be provided for stopping the process at or after any one or more of its several stages or steps, instead of making it non-stop and continuous. Furthermore, more than one temporary carrier may be employed either in tandem or side-by-side relation, if production exigencies should so dictate.

With regard to the components and proportions of the organosol or plastisol formulation, a typical example is as follows:

100 parts by weight of Bakelite Vinyl Resin QYNV, which is a vinyl chloride film forming dispersion resin marketed under the designation QYNV by the Bakelite Company, a division of the Union Carbide and Carbon Corporation, and which is described with more particularity as a high molecular weight vinyl chloride polymer substance in the booklet entitled "Technical Release No. 14," dated July 1954, and published by the Bakelite Company.

60 parts of Flexol Plasticizer DOP, which is di-2-ethylhexyl phthalate, and sold under the designation Plasticizer DOP by the same Union Carbide and Carbon Corporation.

A suitable alternate for the Bakelite QYNV dispersion resin is the commercial product known as Geon 121, which is also a polyvinyl chloride resin powder put out by the B. F. Goodrich Chemical Co., and described more particularly in Service Bulletin PR–3 of June 1954 entitled "Geon Resin 121" published by B. F. Goodrich Chemical Company of Cleveland, p. 24. Vinyl chloride co-polymers as, for example, a co-polymer of vinyl chloride and vinyl acetate, also may be substituted; or Opalon #410, a polyvinyl chloride resin made by Monsanto Chemical Company may be used.

Alternate plasticizers, stabilizers and volatiles may be added to the mix as set forth in the publication entitled "Vinylite Resins Dispersion Coatings," published by the Bakelite Company, New York, N. Y., copyright 1949, p. 49; and as further described in the B. F. Goodrich Chemical Company's bulletin on Geon Resin 121 identified above.

As the modifying agent in the vinyl dispersion, from 1 to 12 parts by weight of Hylene M or MDI may be added to the composition above described. Hylene M is the trademark name of the product methylene bis 4-phenyl isocyanate manufactured and sold by E. I. du Pont de Nemours Co. of Wilmington, Del. MDI is the trademark name of the same composition, and is sold by the Mobay Chemical Company of St. Louis, Mo. By the addition of the Hylene M or MDI, substantial improvement in the wet and dry bonding of the flock to the film was obtained which permitted repeated washing with soap and water, and with only negligible loss of flock attendant thereon.

In place of the Hylene M or MDI, other di-isocyanates, mono-isocyanates, or tri-isocyanates may be substituted, as for example, Hylene T, Hylene TM, or Hylene TDI. Hylene T specifically is the di-isocyanate, 2,4-toluene di-isocyanate. TDI specifically is the same di-isocyanate, but is manufactured not by Du Pont but by the Mobay Chemical Company. Hylene TM, also marketed by Du Pont, is a mixture of isomers of toluene di-isocyanate.

A further improvement in the fixation of the flock to the film was obtained by decreasing the amount of the Flexol DOP plasticizer from 25% to 50%, and substituting in the dispersion in place thereof equivalent amounts of the polyester type plasticizer known as Paraplex G–50 made by Rohm & Haas Co. of Philadelphia, Pa.

Moreover, by increasing the amount of the Hylene M or MDI, or other isocyanates, from the range of from about 1 to about 12 parts by weight to a higher range of from about 12 to about 32 parts by weight, further improvement in the bonding properties of the flock to the film was noted, together with the property of an appreciable water repellency on the part of the flock.

Another typical film forming composition formulation which includes volatiles, plasticizer blends, plasticizers and pigments, and from which good wet and dry fixation of the flock to the film and water repellency of the flock was obtained is the following:

| | |
|---|---|
| Resin QYNV | 100 parts by weight. |
| Plasticizer DOP | 30 parts by weight. |
| Plasticizer Paraplex G50. | 12 parts by weight. |
| Titanium dioxide | 8 parts by weight. |
| Stabilizers | 7 parts by weight. |
| Mineral spirits | 10 parts (or as much as required). |
| Diisobutyl ketone | 5 parts (or as much as required). |
| Hylene M (di-isocyanate). | 15 parts (10% on weight of total resin and plasticizers). |

It will be appreciated that although in the examples set forth above a range of from about 1 to about 12 parts by weight of methylene bis 4-phenyl isocyanate was recited, and an additional modified range of from about 12 to about 32 parts by weight of the di-isocyanate was also given, in practice these ranges or proportions should not be considered per se to be critical, for manifestly with the selection of different isocyanates differing concentrations will be suitable and varying results will be obtained. To cite one instance, it has been found that the di-isocyanate is more effective and gives greater fixation than a mono-isocyanate. Therefore, theoretically at least, in order to get the same amount of attachment, a higher concentration of the mono-isocyanate would have to be used than would be requisite if the di-isocyanate were employed in the film forming composition. There is also the factor of end use that must be taken into account: whereby certain products, in view of their intended function, must be given the property of greater bonding of the flock to the film. Broadly speaking, however, and subject to the exceptional case, the ranges mentioned above have been found satisfactory for the immediate purposes at hand, and increasing the proportion by weight of the isocyanate excessively thereover ordinarily will not justify the additional expense involved in the increase. It is quite possible, however, that in the exceptional case the extra expense would be thoroughly justified.

It is also noted that instead of laying down and processing the film of vinyl chloride with flock, on a temporary carrier of paper or other material intended to be stripped or separated from the film at the end of the processing, the carrier 11 may be a cloth fabric, and the film 19 permitted to remain in contact with, and laminated to the fabric surface even after the processing has been completed. In this embodiment, both the flocked film 19 and the accompanying cloth carrier 11 are wound up as one or as a unit, on the delivery roller 30. By such means the soft and supple flock surface of the unsupported film 19 may be imparted to at least one side or surface of the cloth fabric. At the same time there results an improvement in the normally poor tear resistance of the vinyl film, such improvement being borrowed, so to speak, from the coacting and superior tear resistance of the cloth.

What is claimed is:

1. Method of making a flocked fabric characterized by a coated surface resistant to repeated washings, comprising coating at least one surface of a piece of fabric with a liquid dispersion containing polyvinyl chloride, plasticizer and an organic isocyanate modifier, partially drying the coated fabric to increase the viscosity of the coating, adhering flock to the partially dried coating, fusing the polyvinyl chloride dispersion with dry heat thereby forming a flocked film on said fabric, and subjecting said film to steam thereby imparting an attractive appearance to the flocked film.

2. Method of making a washfast flocked film characterized by a surface resistant to repeated washings, comprising coating a temporary carrier with a liquid dispersion containing polyvinyl chloride, plasticizer and an organic isocyanate modifier, partially drying the dispersion to increase its viscosity, adhering flock to the partially dried dispersion, fusing the polyvinyl chloride dispersion with dry heat thereby forming a flocked film on said temporary carrier, subjecting said film to steam thereby imparting an attractive appearance to the flocked film, and stripping the flocked film from the temporary carrier.

References Cited in the file of this patent

UNITED STATES PATENTS

| | | |
|---|---|---|
| 2,222,539 | Meston | Nov. 19, 1940 |
| 2,430,479 | Pratt et al. | Nov. 11, 1947 |
| 2,502,926 | Chadwick et al. | Apr. 4, 1950 |
| 2,576,276 | Berglund | Nov. 27, 1951 |
| 2,577,381 | Stirnemann | Dec. 4, 1951 |
| 2,681,036 | Ewing et al. | June 15, 1954 |

FOREIGN PATENTS

| | | |
|---|---|---|
| 588,447 | Great Britain | May 22, 1947 |